US006697458B1

(12) United States Patent
Kunjibettu

(10) Patent No.: US 6,697,458 B1
(45) Date of Patent: Feb. 24, 2004

(54) SYSTEM AND METHOD FOR SYNCHRONIZING VOICE MAILBOX WITH E-MAIL BOX

(75) Inventor: Shreesha Kunjibettu, Sunnyvale, CA (US)

(73) Assignee: Ulysses ESD, Inc., San Jose, CA (US)

( * ) Notice: Subject to any disclaimer, the term of this patent is extended or adjusted under 35 U.S.C. 154(b) by 225 days.

(21) Appl. No.: 09/613,419

(22) Filed: Jul. 10, 2000

(51) Int. Cl.[7] .............................................. H04M 1/64
(52) U.S. Cl. ............................... 379/88.17; 379/88.13; 709/206
(58) Field of Search ........................ 379/88.22, 88.13, 379/88.18, 88.11, 88.12, 88.14, 88.16, 88.17; 370/401; 455/556; 709/206

(56) References Cited

U.S. PATENT DOCUMENTS

| | | | | | |
|---|---|---|---|---|---|
| 5,647,002 | A | * | 7/1997 | Brunson .................. | 379/88.18 |
| 5,948,059 | A | * | 9/1999 | Woo et al. ................ | 709/206 |
| 5,951,638 | A | * | 9/1999 | Hoss et al. ............... | 709/206 |
| 6,018,762 | A | * | 1/2000 | Brunson et al. .......... | 709/206 |
| 6,208,658 | B1 | * | 3/2001 | Pickett ..................... | 370/401 |
| 6,219,694 | B1 | * | 4/2001 | Lazaridis et al. ......... | 455/556 |
| 6,341,160 | B2 | * | 1/2002 | Tverskoy et al. ........ | 379/88.17 |
| 6,351,523 | B1 | * | 2/2002 | Detlef ...................... | 379/88.17 |
| 6,360,272 | B1 | * | 3/2002 | Lincke et al. ............. | 379/88.18 |
| 6,373,926 | B1 | * | 4/2002 | Foladare et al. ......... | 379/88.13 |
| 6,396,908 | B1 | * | 5/2002 | O'Donovan et al. ..... | 379/88.17 |
| 6,418,200 | B1 | * | 7/2002 | Ciccolella et al. ........ | 379/88.17 |

* cited by examiner

*Primary Examiner*—Fan Tsang
*Assistant Examiner*—Gerald Gauthier
(74) *Attorney, Agent, or Firm*—Gary S. Williams; Pennie & Edmonds LLP

(57) ABSTRACT

Voice messages are stored in both a user's voice mailbox in a voice mail system and an e-mail box in an e-mail system distinct from the voice mail system. When a voice message is stored in a user's voice mailbox in the voice mail system, a corresponding e-mail message is sent to and stored in an e-mail system with the voice message located in an attachment to the e-mail message. Information identifying the voice mail system and the voice mail message are included in a predefined portion of the email message, such as a particular field of the header. At predetermined times the user's voice mailbox and e-mail box are synchronized. In particular, the voice mail system uses standard e-mail protocols to retrieve the predefined portion of the e-mail messages sent by the voice mail system, analyzes the retrieved information to determine what updates need to be performed to synchronize the information contained in the two systems, and then performs the synchronization, deleting messages and changing the status of messages as needed.

36 Claims, 9 Drawing Sheets

SYSTEM AND METHOD FOR SYNCHRONIZING VOICE MAILBOX WITH E-MAIL BOX

The present invention relates generally to unifying access to a user's e-mail box and voice mailbox, and particularly to a system and method for storing voice messages in an e-mail box and synchronizing the voice mailbox and the e-mail box to accurately reflect the state of each voice message.

BACKGROUND OF THE INVENTION

For over a decade voice mail systems have facilitated communications between people. Whether for business or for pleasure the advantages of voice mail systems are numerous and have been well documented. Voice mail systems are highly popular and to this end many people rely on this technology to accomplish their day to day tasks. Another common means for communications is e-mail. Even though e-mail systems predate voice mail systems, their potential for communicating was left largely unnoticed outside of academia. However, with the proliferation of the web browser, businesses and personal use of e-mail systems have become commonplace. Its popularity has transcended various cultures, age groups, and uses. For many it is the preferred means of communications.

Voice mail systems are developed by various different vendors. Most vendors have developed their own distinct system. Thus, different vendors may offer different features and implement their systems differently. A voice mailbox is usually associated with a phone number. Whoever "owns" the phone line chooses which type of voice mail system they wish to use. For example, phone companies may offer voice mail to their residential customers using a particular system, whereas a business with its own telecommunications equipment may use a distinct voice mail system for its employees. Different systems may use incompatible standards to implement their system. Even if companies use the same standards, the systems usually operate independently of each other. Thus, a user of one voice mail system may not access another voice mail system.

Conversely, e-mail systems have been developed on a set of public standard protocols. Vendors may produce different systems with different features, but e-mail systems can send messages to other e-mail systems. Those e-mail systems will be able to correctly interpret its destination and the message because of the use of a common protocol. Thus, e-mail users can effortlessly communicate with e-mail users on other systems.

Even though voice and data were originally different technologies, they are moving closer and closer together. Voice traffic can be carried over the Internet and data can be sent over phone lines. This growing convergence is evident by the attempts to unify voice mail messages and e-mail messages. Merging these two technologies would simplify the management of information and save people time. It is not unknown in the art to unify e-mail and voice mail systems. This idea would allow users of both technologies to retrieve their voice messages through their email systems. It would save time by allowing access to information in both systems through access of one system. But by allowing the user to access both sets of information via one system, issues immediately arise of synchronizing the systems to avoid redundancy. For example, once a voice mail message is deleted in the e-mail system, it should also be deleted in the voice mail system. Otherwise, the user may be confused when reviewing messages in the voice mail system as to whether the message is a new message or the one previously deleted by the user. In addition, having to explicitly delete each voice mail message twice makes the use of such systems unduly tedious.

Prior solutions address this problem in several ways. One solution is to generate a detailed database for all the messages on both systems. Each message in the database contains two ID's, one for the voice message and one for the e-mail message. Whenever a change is made in one of the systems, the database must be updated. The database ensures that each system contains current information about the status of each voice message. Although this implementation allows the user to access voice mail messages via an e-mail system, it is more complex than it might initially appear. First, most voice mail servers do not include a database management system, and thus database and search procedures must be added to the voice mail system in order to implement this solution. Second, since voice mail systems are inherently proprietary, implementing the invention requires expensive proprietary programming, both for the database as well as for the interactions between the voice mail system and the e-mail system.

This solution may require tracking all e-mail messages instead of only the ones intended to be used for both systems. The maximum number of voice messages stored per user is typically less than a hundred, while there is typically no set maximum number of e-mail messages stored per user and, in fact, many users keep hundreds or thousands of e-mail messages in their e-mail box. As a result, the database in the hypothetical system needs to keep track of a potentially much larger set of messages than just the voice mail messages, requiring a more robust and thus more complex and more expensive database management system than one that only had to track the ID's and status of voice mail messages.

Another potential solution is to use a single system to store all of the information for both the e-mail system and the voice mail system. This would eliminate any synchronization problems. However, this would require replacing existing e-mail and voice mail systems with a single system. It is unknown if this option is technically feasible, and it does not solve the problem for those users who wish to keep their current systems. For instance, a user may have a long-standing e-mail address, known to the user's personal and/or business acquaintances, that he or she is reluctant to change, or the "user" may be a business with a large investment in a particular voice mail system and/or e-mail system.

SUMMARY OF THE INVENTION

In summary, the present invention is a system and method that synchronizes voice messages stored in both a user's voice mailbox in a voice mail system and an e-mail box in an e-mail system distinct from the voice mail system, using standard e-mail protocols. Each user of the voice mail system may use a distinct e-mail system from the other users. The present invention does not require drastic changes to existing e-mail or voice mail systems. Nor does it require the voice mail server to implement a database for keeping track of the ID's and status of voice mail messages stored in the e-mail system. Instead, the present invention uses functionality already built into standard e-mail systems by relying on standard Internet protocols such as IMAP.

When a voice message is stored in a user's voice mailbox in the voice mail system, a corresponding e-mail message is sent to and stored in an e-mail system with the voice message located in an attachment to the e-mail message. The invention stores certain information in a predefined portion of the email message, preferably the header. By looking at this information, the invention can easily determine which e-mail messages in the user's e-mail box are also associated with the voice mail system. At predetermined times, the invention synchronizes the user's voice mailbox and e-mail box in the two systems. The present invention does not use a database in the voice mail system to store information about which e-mail messages in the user's e-mail box correspond to voice mail messages in the voice mail system, and further the voice mail system does not retrieve and analyze all the e-mail messages in the user's e-mail box to determine which correspond to the voice mail messages. Rather, the voice mail system uses standard e-mail protocols to retrieve the predefined portion of the e-mail messages sent by the voice mail system, analyzes the retrieved information to determine what updates need to be performed to synchronize the information contained in the two systems, and then performs the synchronization, deleting messages and changing the status of messages as needed.

The present invention does not require implementing a new voice mail or e-mail system because it works with existing systems. It is efficient because it does not require any additional databases to be implemented in the voice mail system or elsewhere, and because during synchronization it only retrieves e-mail messages with a voice mail counterpart. Further, because the present invention is based in part on standard e-mail protocols, it should work with any existing e-mail system using one of these standards.

The present invention can include several useful features. For instance, the present invention may be configured to inform a user of the e-mail system whether or not a voice message originated from the user's voice mail system. Also, when a user's voice mailbox is full, the present invention may be configured to accept additional "overflow" voice mail messages and to route the overflow voice mail messages to the e-mail system, providing valuable information to the user. It would let the user know that the user's voice mailbox is full, provide the content of the overflow voice mail messages, and let the user know that these messages are only located on the e-mail system. The present invention may be further configured to enable a user to be able to delete a message from the voice mail system but forward a copy to the user's e-mail box in an e-mail system. When the present invention is configured to provide these features, the predetermined information stored in the e-mail messages would distinguish these types of messages as overflow and forward & delete messages so that the synchronization process does not mistakenly delete them.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
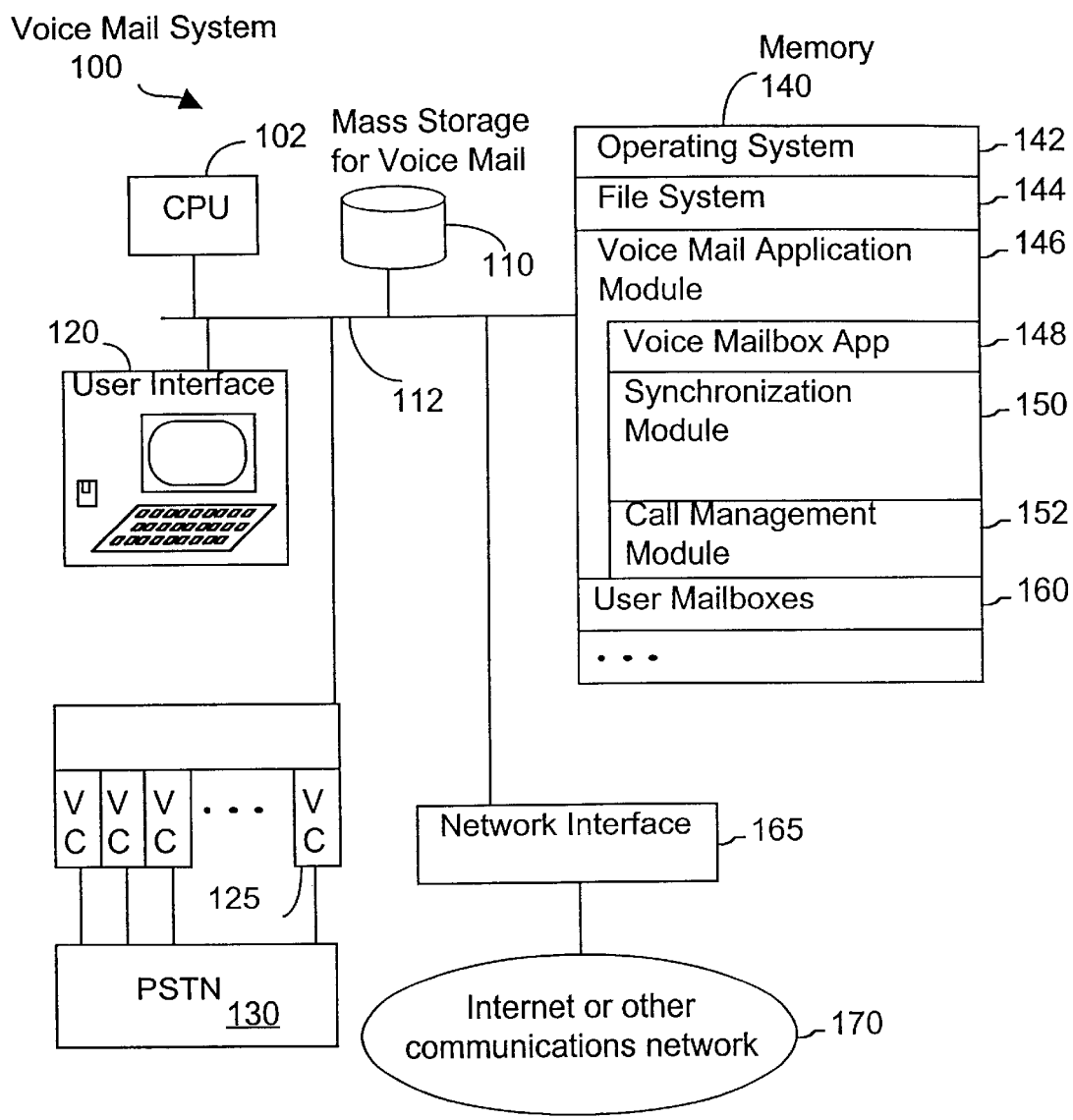
FIG. 1 is a block diagram of a preferred embodiment of a voice mail system in accordance with the present invention.

Referring to FIG. 1, there is shown a voice mail system 100. The system preferably includes a central processing unit 102, a mass storage for voice mail 110, a user or system operator interface 120, one or more voice cards 125 for receiving phone calls from a public service telephone network 130, memory 140 (which may include random access memory as well as disk storage and other storage media), a network interface 165 for connecting the system 100 to other systems (such as an e-mail server system 400, FIG. 4) via the Internet or other communications network 170, and one or more buses 112 for interconnecting the aforementioned elements of the system.

The operation of system 100 is controlled primarily by control programs that are executed by the system's central processing unit 102. In a typical implementation, the programs and data structures stored in the system memory 140 will include:

an operating system 142 that includes procedures for handling various basic system services and for performing hardware dependent tasks file handling system 144;

a voice mail application module 146, including a voice mailbox application 148, a synchronization module 150 and a call management module 152; and user voice mailboxes 160 for use by the users of the voice mail system.

Figure 2:
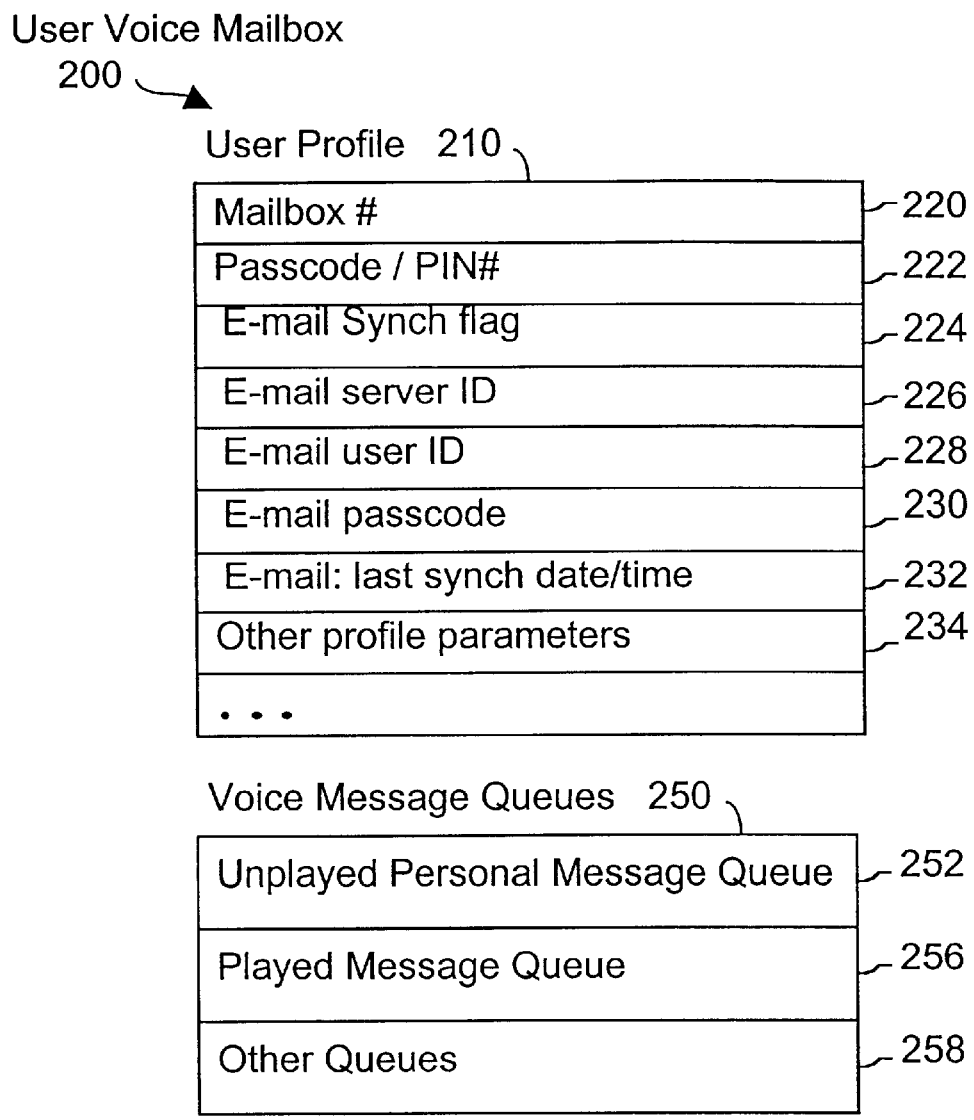
FIG. 2 is a block diagram of a preferred embodiment the user voice mailbox in accordance with the present invention.

Referring to FIG. 2, each user voice mailbox 200 preferably includes a user profile 210 and a set of message queues 250. The user profile 210, in a preferred embodiment, includes:

a mailbox number 220;

a passcode or PIN (personal identification number) 222, which is used as a password for accessing the user's voice mailbox;

one or more FCOS (feature class of service) flags 224, including an e-mail synchronization enable flag 224 that indicates whether synchronization is enabled or disabled for the voice mailbox corresponding to this user profile;

an e-mail server ID 226, for identifying the e-mail server (if any) to which copies of the user's voice messages are to be sent;

an e-mail user ID 228, identifying the user's e-mail box;

an e-mail password 230 for accessing messages in the user's e-mail box;

an e-mail synchronization time stamp 232; and other profile parameters 234.

The e-mail synchronization enable flag 224 is one of a number of FCOS (feature class of service) flags used to enable or disable various features of the voice mail system with respect to a particular voice mailbox. The other FCOS flags (with one exception noted below) are not discussed here since they are not relevant to the description of the present invention.

A user would typically access the voice mail system 100 through any type of telephone. The user would dial into the system, providing the mailbox number 220 and a PIN 222 to access their account. By using the keypad of the telephone or verbal commands the user can exchange information with the voice mail system 100.

Each user's voice mailbox 200 further includes a set of message queues 250, which in a preferred embodiment are:

- an unplayed personal message queue 252, in which are stored messages until the user has played them;
- a played message queue 256, which is used to store messages previously played by user, but not yet deleted; and
- other queues 258 (e.g., a queue of messages the user has scheduled to be sent to other users of the voice mail system).

It is to be understood that what is stored in these queues 250 is not actual voice messages, but rather message headers with pointers to the disk locations at which the voice messages are stored.

Figure 3:
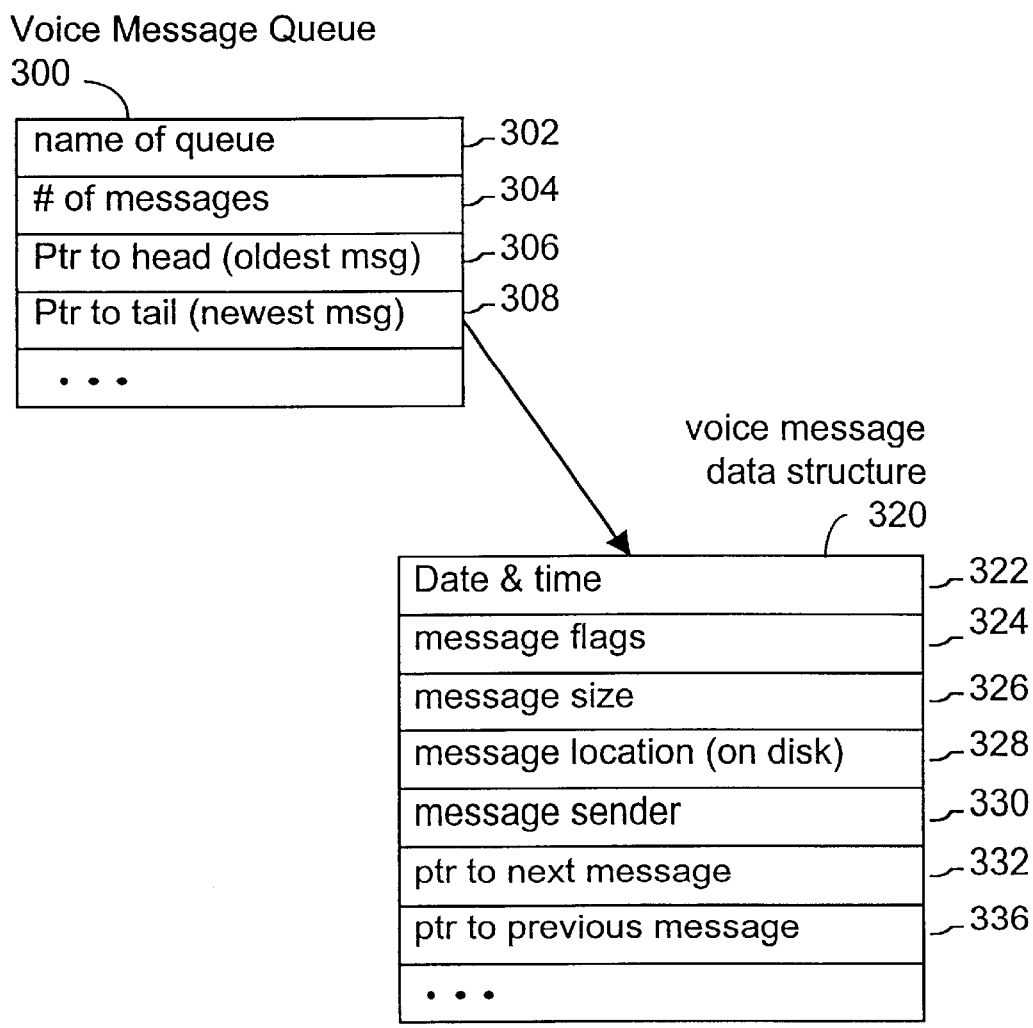
FIG. 3 is a block diagram of a preferred embodiment of a voice message queue and a message data structure.

Referring to FIG. 3, voice message queue 300 may include the following fields:

- the name of the queue 302;
- the number of messages in the queue 304;
- a pointer to the voice message data structure at the head of the queue 306, indicating the first message to be played when the user accesses the message queue; and
- a pointer to the voice message data structure at the tail of the queue 308, indicating the end of the queue to which additional messages can be added.

Each message data structure 320 in the queues 250 may include:

- the date and time the message was sent 322;
- a set of flags associated with the message 324;
- the size of the message 326;
- the disk location of the message 328;
- the voice mailbox number or caller ID (e.g., telephone number) of the message sender 330, if known to the voice mail system;
- a pointer to the next message data structure 332; and
- a pointer to the previous message data structure 336.

It is to be understood that the order of the fields of the message queue and message data structure, as well as the particular set of fields in these data structures, may vary considerably from one implementation to another. Furthermore, such queue and message data structures will typically include other fields that are not relevant to the present discussion.

Figure 4:
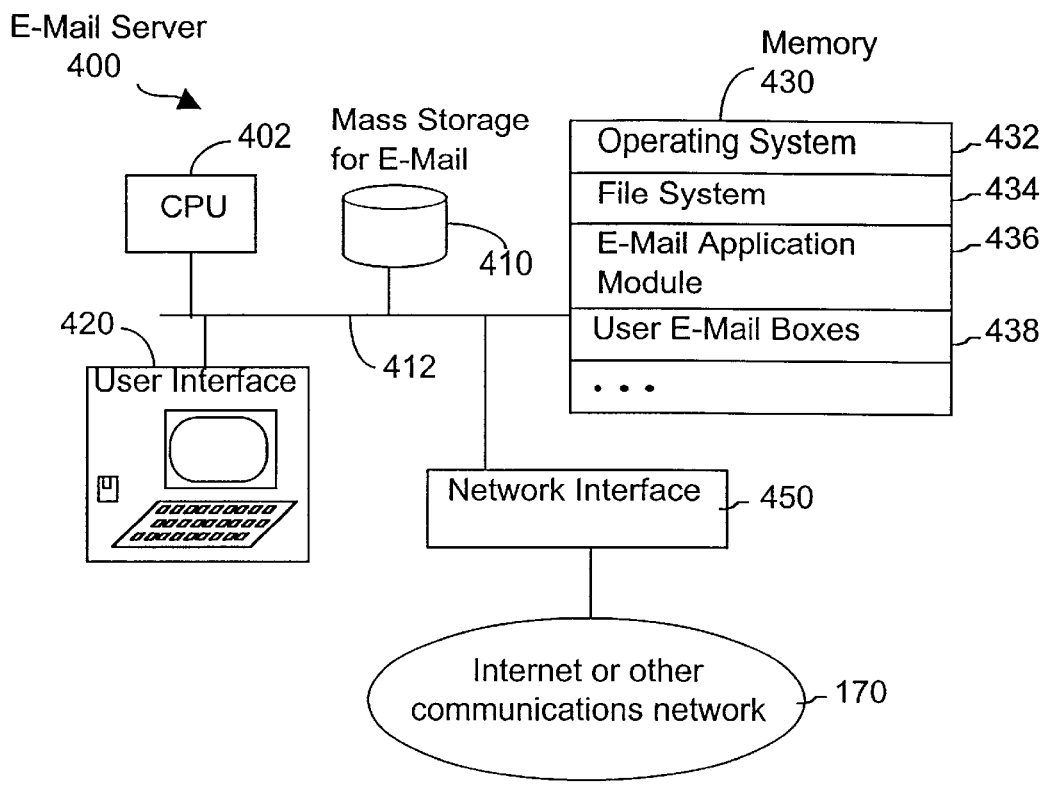
FIG. 4 is a block diagram of a preferred embodiment of an e-mail server in accordance with the present invention.

Referring to FIG. 4, there is shown an e-mail server system 400. A number of such systems may be used in conjunction with the voice mail system 100 (FIG. 1). Furthermore, any particular e-mail system 400 may have user e-mail boxes that are synchronized with voice mailboxes in a plurality of voice mail systems. The e-mail server system preferably includes a central processing unit 402, a user or system operator interface 420, mass storage for e-mail 410, a system memory 430 (which may include random access memory as well as disk storage and other storage media), a network interface 450 for connecting the system 400 to other systems (such as the voice mail server system 100, FIG. 1) via the Internet or other communications network 170, and one or more buses 412 for interconnecting the aforementioned elements of the system.

The operation of e-mail server system 400 is controlled primarily by control programs that are executed by the system's central processing unit 402. In a typical implementation, the programs and data structures stored in the system memory 430 will include:

- an operating system 432 that includes procedures for handling various basic system services and for performing hardware dependent tasks
- a file handling system 434;
- an e-mail application module 436; and
- user e-mail boxes 438 for use by the users of the e-mail system 400.

The e-mail application module utilizes standard protocols, such as IMAP to enable access to the user e-mail boxes by client computers.

Figure 5:
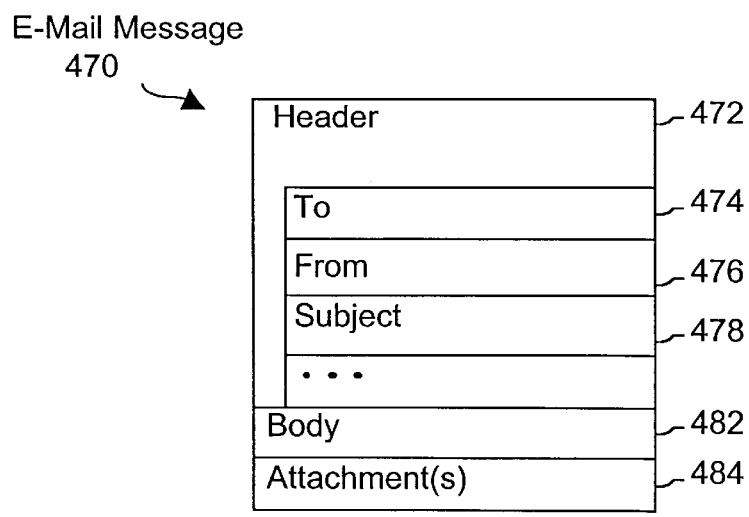
FIG. 5 is a block diagram of a preferred embodiment of an e-mail message in accordance with the present invention.

Referring to FIG. 5, each e-mail message 470 preferably includes:

- a header 472;
- a body 482; and
- any attachments 484.

It is to be understood that the header 472 will contain information based on which Internet protocol and e-mail server are being used. For the preferred embodiment, the header 472 will include, a To line 474, a From line 476, and a Subject line 478.

When a voice message is received by the voice mail system, it is stored in the voice mailbox of the user to whom the message is directed. In addition, if the user's voice mailbox profile identifies an e-mail server and e-mail box, the voice mail system 100 sends a corresponding e-mail message 470 to the identified e-mail server 400. The e-mail message 470 contains a predefined portion that identifies the voice message. In the preferred embodiment, the predefined portion will contain a voice mail type, a voice mail ID (to identify the voice mail message), a time stamp, voice mailbox ID (to identify the voice mailbox of the user), and the voice message server ID (to identify the voice message server). The voice mail type may be a string that indicates whether the voice message is stored on both the voice mail system 100 and the email server 400. For instance, in one embodiment the voice mail type will be one of three values, signify one of three different types of voice messages: copy, forward & delete, and overflow. A copy message is a message that is stored in both systems. A forward & delete message is a voice message was deleted on the voice mail system 100, but which the user requested be forwarded to the e-mail server 400. An overflow message indicates that the user's voice mailbox was full at the time the voice message was received and that the message was routed to the e-mail server 400. Of these three, a copy message is the only type of voice mail message that is a candidate for synchronization. The other two types of voice messages are stored only in the user's e-mail box. Furthermore, the presence of one or more overflow messages in the user's e-mail box provides valuable information to the user—that the user's voice mailbox is full.

In other embodiments, additional or different information may be included by the voice mail system in the "predefined portion" of the e-mail message when the voice mail system forwards voice messages to the user's e-mail box so as to pass other types of information to the user. For instance, caller ID information, indicating the telephone number of the person who left the message, may be included in the predefined portion.

The remainder of the predefined portion of the e-mail messages sent by the voice mail system is used to map each voice message in the voice mail system to a unique e-mail message and vice versa. Preferably, the predefined portion will be stored as a string and placed in the e-mail message's subject line 478. It is understood that this information may be placed in other parts of the e-mail message header 472, the body 482, attachments 484, or transferred to the e-mail system in a different manner. The voice message will be stored as an attachment 484 in a known audio format such as a WAV, AU, RM, AIF, or any other suitable format, now known or developed in the future.

Figure 6:
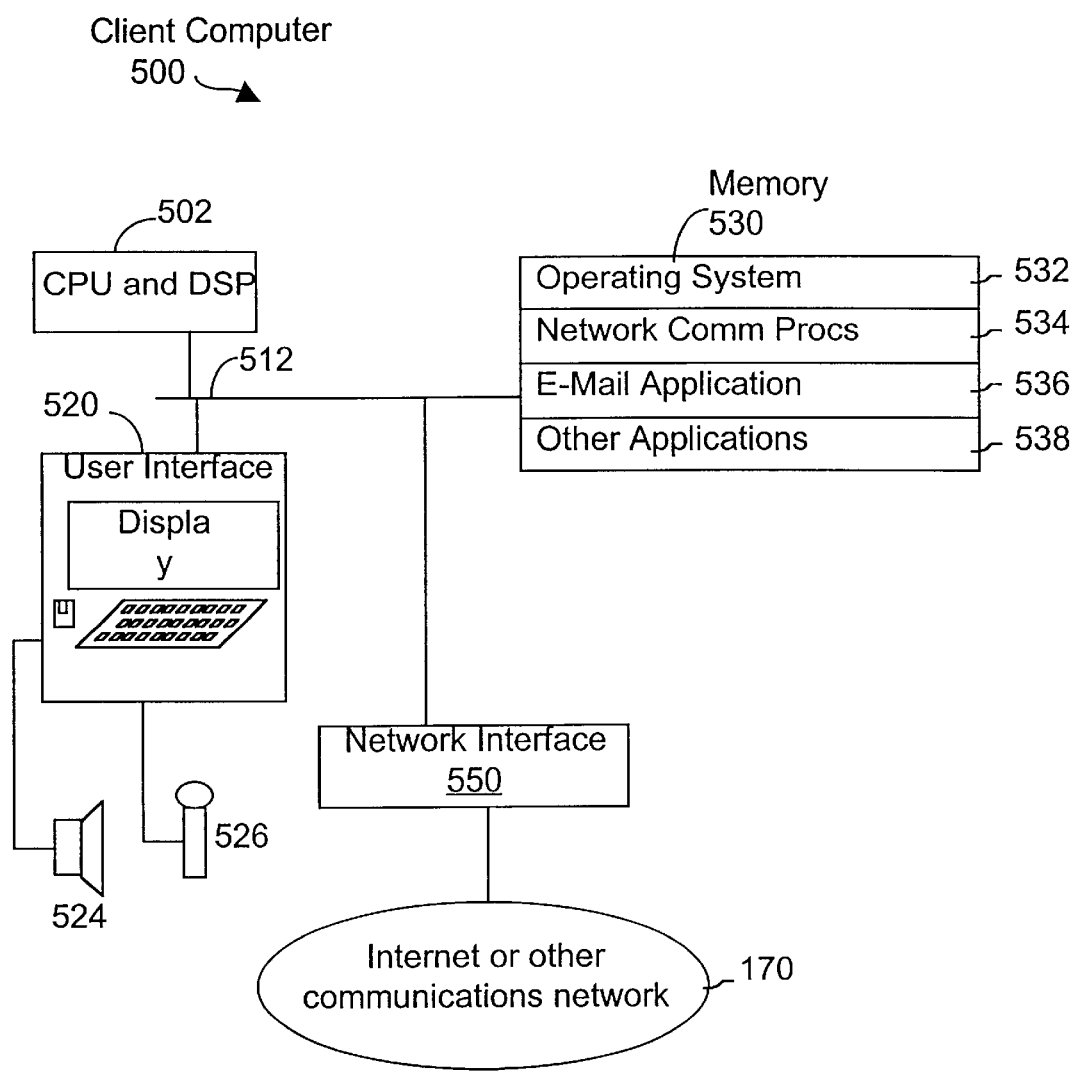
FIG. 6 is a block diagram of a preferred embodiment of a client computer in accordance with the present invention.

Referring to FIG. 6, there is shown a client computer 500 that may be used to access messages in an e-mail box in the e-mail server 400. The computer preferably includes a central processing unit 502, a user or system operator interface 520, a system memory 530 (which may include random access memory as well as disk storage and other storage media), a network interface 550 for connecting the system 500 to other systems (such as the e-mail server system 400, FIG. 4) via the Internet or other communications network 170, and one or more buses 512 for interconnecting the aforementioned elements of the system. The user interface 520 preferably includes a speaker 524 to enable a user of the client computer to listen to voice messages. If the user of the client computer 500 may compose voice messages, the user interface 520 will further include a microphone 526.

The operation of the client computer 500 is controlled primarily by control programs that are executed by the system's central processing unit 502. In a typical implementation, the programs and data structures stored in the system memory 530 will include:

an operating system 532 that includes procedures for handling various basic system services and for performing hardware dependent tasks;
network communication procedures 534;
an e-mail application module 536; and
other applications 538.

A user would typically access their account on the e-mail server 400 by using a client computer 500. The client computer could access the e-mail server through its network interface 550. The e-mail application 536 could interchange information with the e-mail server. Thus, a user can access all the capabilities of the e-mail server through the client computer 500. It is known that other devices, such as wireless phones, personal digital assistants, and television-based web-browsers, may be used to access e-mail servers.

Figure 7A:
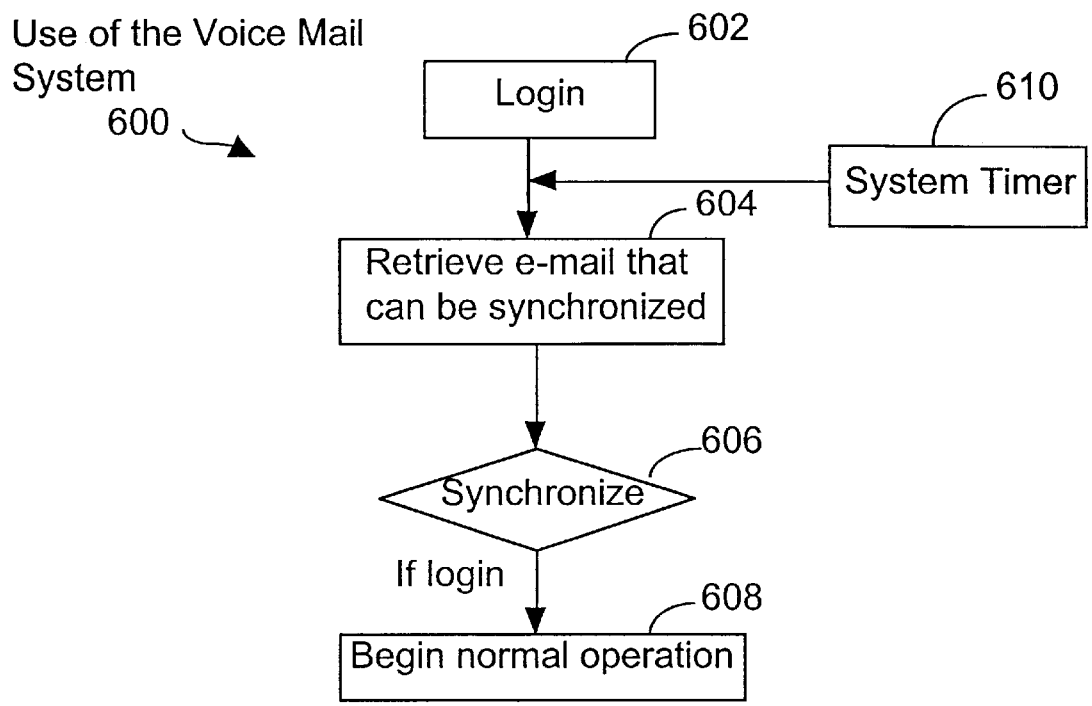
FIG. 7A is a flow chart of a preferred embodiment of a method for initiating synchronization of a user's voice mailbox and e-mail box.

At a predetermined time, the voice mail system 100 synchronizes a user's voice mailbox with the corresponding mail box in an e-mail server 400. Synchronization can occur at many different times. One of the most common times would be when the user logs onto the voice mail system 100. An overview of this method is shown in FIG. 7A. When the user logs into the voice mail system 100 (step 602), the voice mail system uses the e-mail server ID 226, e-mail user ID 228, and e-mail password 230 in the user profile 210 (FIG. 2) to access the user's e-mail account in the identified e-mail server 400. The voice mail system 100 retrieves the headers, or a portion of the headers, of only those e-mail messages 470 with the appropriate designation (step 604). For example, in a preferred embodiment the voice mail system 100 sends a query requesting header information for e-mail messages whose subject line includes a specific string that includes the voice mail system ID, the voice mailbox ID of the user, and a voice message type of "copy message". The messages which meet these criteria are candidates for synchronization with the voice mail system performing the synchronization operation. (Note that if the user's e-mail box stores messages from more than one voice mail server, the inclusion of the voice mail system ID in the query will filter out e-mail messages corresponding to voice messages from other voice mail servers.)

Once the information about the e-mail messages that are candidates for synchronization is received, the voice mail system performs the synchronization process (step 606). Once finished, the user continues using the normal functions of the voice mail system (step 608).

The voice mail system may also have an automatic timer 610 that schedules times at which to retrieve e-mail information and begin the synchronization process automatically. This may be done only a daily, weekly, or monthly schedule. This is particularly useful for the users who rarely use the voice mail system but often interact with the e-mail server.

In the voice mail system, the status information of each voice message is indicated in part by the message queue in which it is stored as well as by the message flags 324. In the e-mail system the status of each voice message is indicated by one or more status flags that is associated with each e-mail message; the exact method of storing such status flag ay differ from one e-mail system to another. The status information indicates whether a message has been played by the user, if the message has been forwarded to someone else, if a message has been replied to, if the message has been marked for deletion, and so on. In e-mail systems that use IMAP some of the frequently used status flags (called system flags) that are associated with each e-mail message are: "\Seen," which indicates whether the body of the message has been seen by the user, "\answered," which indicates whether the message has been replied to, "\Deleted," which indicates whether the message has been marked for deletion. When the user directly accesses the e-mail box, this status information is indicated by visual markers or flag icons next to other information (e.g., the subject field) identifying the message. When a remote system accesses the e-mail box, the status flags for each retrieved message may also be retrieved.

Figure 7B:
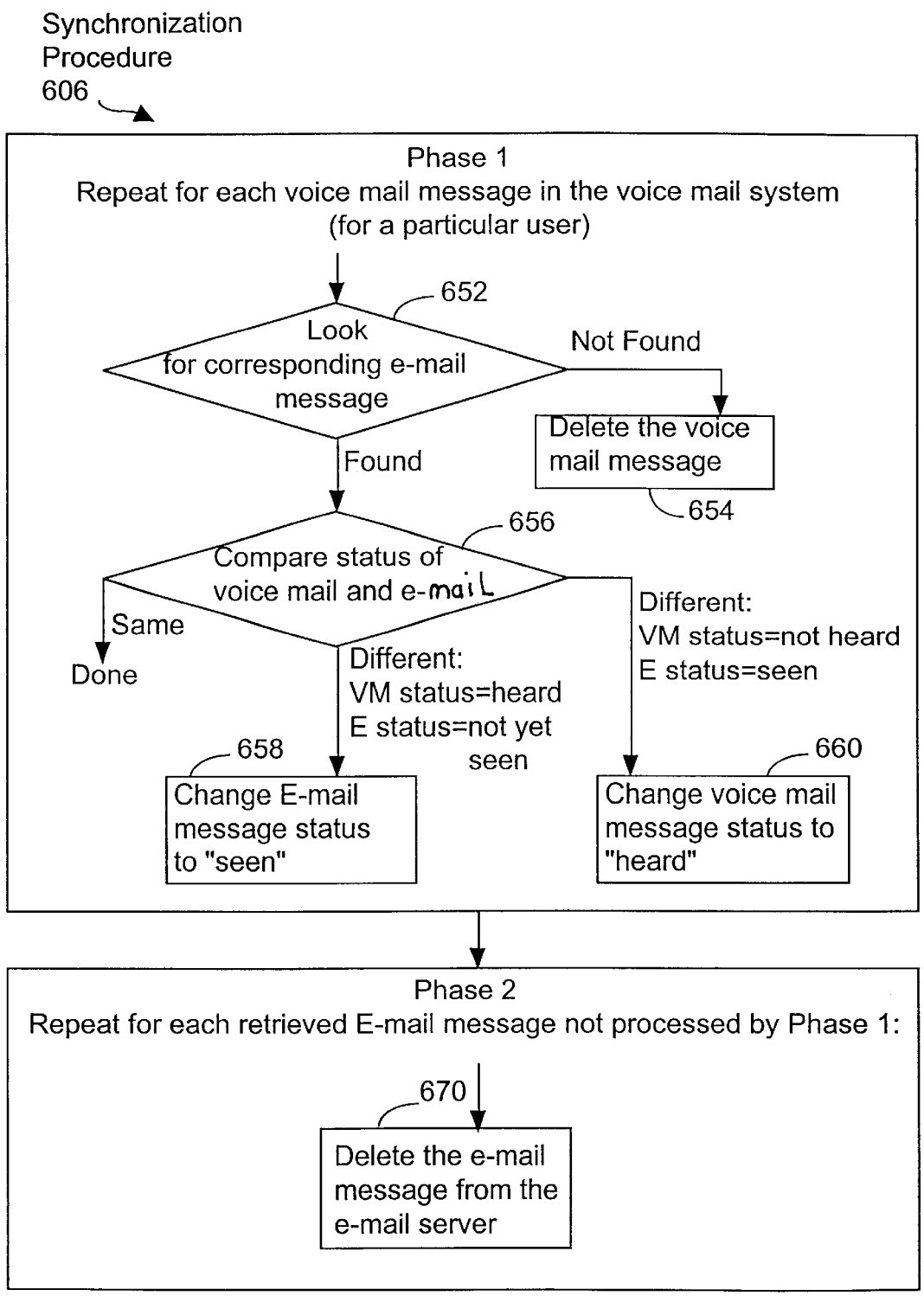
FIG. 7B is a flow chart of a preferred embodiment of a method to synchronize of user's e-mail box and voice mailbox.

Referring to FIG. 7B, the synchronization process 606 has two phases, herein called Phase 1 and Phase 2. In Phase 1 each voice mail message in the voice mailbox of the user is processed as follows. First, the information retrieved from the user's e-mail box is searched for a message corresponding to the voice mail message (652). If none is found, the voice mail message is deleted (654) because the corresponding e-mail message has been deleted from the e-mail server.

If the corresponding e-mail message is found, the heard/seen status of the voice mail message and the e-mail message are compared (656). If they are the same (e.g., the voice mail message status is "heard" and the e-mail message status is "seen", or the voice mail message status is "not heard" and the e-mail message status is "not seen", then no further action is required.

If the status values of the two messages are different, and in particular one is set to heard/seen and the other is not, then the other message's status is set to heard/seen (658, 660) so as to synchronize the status of the two corresponding messages. More specifically, if the voice mail message status is "heard" and the e-mail message status is "not seen" then the e-mail message status is changed to "seen" (658) by sending an appropriate command to the e-mail server. If the voice mail message status is "not heard" and the e-mail message status is "seen", then voice mail message status is changed to "heard" and the voice mail message is moved to the Played Message Queue (660).

In Phase 2, which is performed after all the voice mail messages have been processed by Phase 1 of the synchronization procedure, each of the e-mail messages for which information was retrieved but which was not processed in Phase 1 is marked for deletion (670), because the corresponding voice mail messages have been deleted from the voice mail system.

In a preferred embodiment, when an identified voice mail message is "deleted," the voice mail system marks the identified message for deletion. The actual deletion may occur at a later time, such as when a garbage collection operation is performed. Voice mail messages marked for deletion, but not yet deleted, are not accessible by the user.

E-mail messages marked for deletion are not actually removed from the e-mail server until an "expunge" command is executed. In one embodiment of the present invention, an "expunge" command is executed at the end of the synchronization procedure only if a FCOS flag (not previously described), herein called the "Disable IMAP expunge on exit" flag, is not enabled (i.e., only if this FCOS flag is not included in the user profile). If this flag is not enabled, then an expunge is performed at the end of the synchronization procedure, causing the e-mail messages marked for deletion to be removed from the e-mail system. If the e-mail messages marked for deletion are not removed (because the "Disable IMAP expunge on exit flag" is enabled for the voice mailbox), then the user will have the opportunity to access those messages at a later time, may optionally unmark them for deletion, and may determine when to perform an expunge (using e-mail client commands) so as to remove any e-mail messages marked for deletion.

Figure 7C:
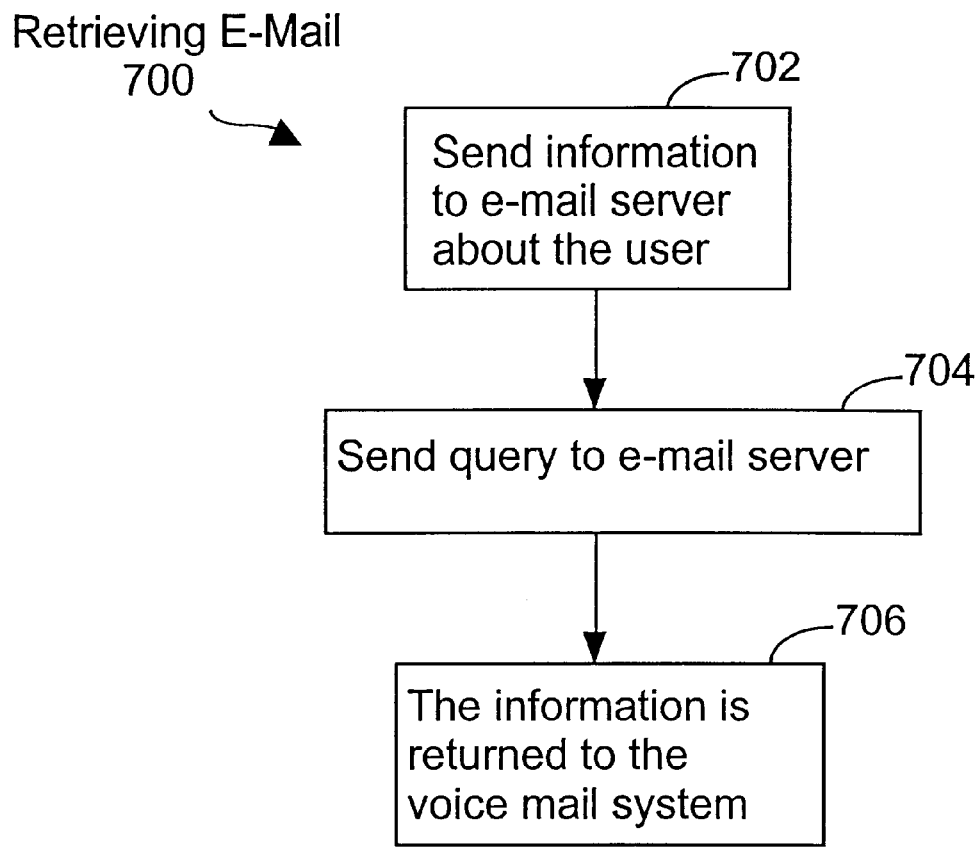
FIG. 7C is a flow chart of a preferred embodiment of a method to retrieve information about voice messages stored in an e-mail system.

Referring to FIG. 7C, more details of the process of retrieving information from the e-mail server 400 is given. The voice mail system 100 accesses the user's e-mail box in the e-mail server 400 using the information in the user profile (702). The voice mail system furthermore sends a query to the e-mail server (704), requesting information identifying e-mail messages containing a predefined string in the predefined portion of those e-mail messages, and the e-mail server returns the requested information (706). For instance, the e-mail server may return the headers of the messages meeting the query criteria or it may return just the identifiers and message status information for the e-mail messages meeting the query criteria.

Figure 8:
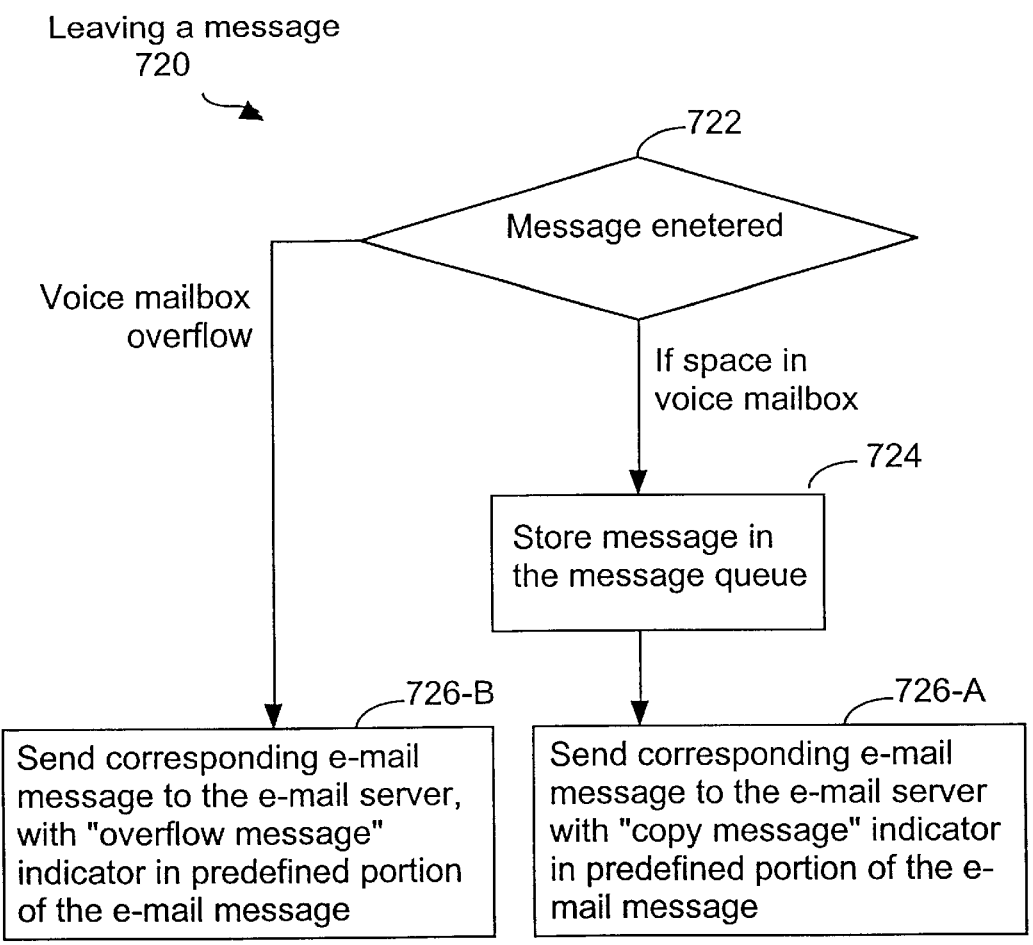
FIG. 8 is a flow chart of a preferred embodiment of a method for leaving a voice mail message and for handling overflow of a user's voice mailbox.

In the preferred embodiment the voice mail server provides information about the overflow status of the voice mail server to the user through the e-mail server 400. Referring to FIG. 8, when a message is received by the voice mail system for a particular user, if there is space in the user's voice mailbox to store the message (722) the message is stored in the unplayed message queue 250 of the user's voice mailbox (724) and a corresponding e-mail message is sent to the e-mail server 400 for storage in the e-mail box of that particular user (726-A). In this circumstance, the information stored by the voice mail system in the predefined portion of the e-mail message identifies the message as a copy message.

If the user's voice mailbox is full (722), it cannot store any new messages. In the preferred embodiment, the voice mail system routes these messages to the e-mail server 400 directly (726-B). In this circumstance (726-B), the information stored by the voice mail system in the predefined portion of the e-mail message identifies the message as an overflow message, as opposed to a copy message, to indicate to the user that this is an overflow message from the voice mail system 100. For instance, the information in the predefined portion for such messages may be a message subject line having the text "overflow message from voice mail system" as well as a voice mail system ID and other information in the subject line of the e-mail message. As described earlier, overflow e-mail messages are not accessed by the voice mail system during synchronization. Once the user receives the overflow e-mail message through the e-mail server 400, the user will know that user's voice mailbox is full.

Another useful feature is when a user wants to delete a message from the user's voice mailbox, but keep a copy of the message as an e-mail message in the e-mail server 400. To do this, a "forward & delete" copy of the voice mail message is sent to the e-mail server with information in the predefined portion to indicate that this is a voice message located only on the e-mail server 400. Thus, it would not be a candidate for synchronization. The original copy of the voice message sent to the e-mail server when the voice message was initially received will be automatically deleted during synchronization. Alternately, the original e-mail message having the voice message may be deleted as soon as the new e-mail message with the "forward & delete" copy of that voice message is successfully sent to the e-mail server. The "forward & delete" copy of the message will not be deleted until it is explicitly deleted by the user or by another mechanism, such as a mechanism for automatically deleting e-mail messages more than a certain number of days old.

In addition, it is possible that other messages from the voice mail server 100 could be sent to the e-mail server to provide information to the user.

Alternate Embodiments

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

In the preferred embodiment, the voice mail system initiates the synchronization process. It is possible that the e-mail system initiates the synchronization process, preferably when the user logs into the e-mail server. This process would mirror the synchronization process described above. The e-mail server may also provide the voice mail system with information about the user's e-mail box. For example, if the e-mail box is full, it could send a prerecorded message to the voice mailbox to inform the user.

Furthermore, it is possible to translate a voice messages and deliver them as text to the e-mail server. Voice to text translators are known. Likewise, text e-mail messages could be translated into voice messages and delivered to the user's voice mailbox. In this situation, the user can access all their messages from either system. In the alternative, a user may attach a microphone to the client device and record voice messages that can then be routed to the voice mailbox via the e-mail server.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of synchronizing voice messages in a voice mailbox in a voice mail server for a particular user with corresponding messages in an e-mail box for the same particular user, the e-mail box in an e-mail server distinct from the voice mail server, comprising:

upon storing a voice message in the voice mailbox of the particular user, sending for storing in the e-mail box of the particular user a corresponding e-mail message having a predefined portion that identifies the voice message; and performing a synchronization operation on the voice mailbox and e-mail box of the particular user by:

retrieving from the e-mail box predefined portions of the messages therein that correspond to voice messages in the voice mailbox, each retrieved predefined portion identifying the corresponding voice message;

comparing the retrieved predefined portions with the voice messages in the voice mailbox to identify the voice messages, if any, for which there is no corresponding message in the e-mail box; and deleting the identified voice messages;

wherein the retrieving and comparing are performed without creating and without utilizing a database identifying respective voice messages corresponding to respective messages in the e-mail box;

whereby when the particular user deletes from the e-mail box a message corresponding to a voice message, the voice message is automatically deleted from the voice mailbox.

2. The method of claim 1, the comparing further including identifying the e-mail messages, if any, for which there is no corresponding voice message in the voice mailbox; and deleting the identified e-mail messages in the e-mail box;

whereby when the particular user deletes from the voice mailbox a voice message, the corresponding message in the e-mail box is automatically deleted.

3. The method of claim 2, further including:

retrieving from the e-mail box a read status for at least one of the messages therein that corresponds to a voice message in the voice mailbox;

comparing the retrieved read status with a listened-to status for the corresponding voice message in the voice mailbox; and if the retrieved read status does not match the listened-to status, changing one of the read status and listened-to status accordingly.

4. The method of claim 2, further including:

retrieving from the e-mail box a predefined status value for at least one of the messages therein that corresponds to a voice message in the voice mailbox;

comparing the retrieved predefined status value with a corresponding status value for the corresponding voice message in the voice mailbox; and if the retrieved predefined status value does not match the corresponding status value, changing one of the predefined status value and corresponding status accordingly.

5. The method of claim 1, wherein the deleting of the identified e-mail messages in the e-mail box comprises marking the identified e-mail messages for deletion.

6. The method of claim 1, wherein the predefined portion of a message in the e-mail box that corresponds to a voice message in the voice mailbox includes a subject field of a header of the message having text there in that identifies the corresponding voice message.

7. The method of claim 1, wherein the predefined portion of a message in the e-mail box that corresponds to a voice message in the voice mailbox includes a "from" field of a header of the message having text there in that identifies the corresponding voice message.

8. The method of claim 1, wherein the predefined portion of the messages in the e-mail box is selected from a group consisting of a header of the messages and a body of the messages.

9. The method of claim 1, wherein the retrieving, comparing and deleting are performed periodically in accordance with a predefined schedule.

10. The method of claim 1, wherein the retrieving, comparing and deleting are performed when the user first accesses the voice mailbox.

11. The method of claim 1, wherein the retrieving, comparing and deleting are performed automatically by the voice mail system at predetermined intervals.

12. The method of claim 1, wherein the deleting comprising marking the identified voice mail messages for deletion.

13. A voice mail system, for use in conjunction with an e-mail system, comprising:

a mass storage memory for storing voice mail;

a central processing unit (CPU);

a voice mail module, for execution by the CPU;

a synchronization module, for execution by the CPU; and a respective voice mailbox associated with each of a plurality of respective users of the voice mail system, each voice mailbox for storing voice messages;

the voice mail module including instructions for storing a voice message in the voice mailbox of a particular user, and for sending for storing in a e-mail box of the particular user a corresponding e-mail message having a predefined portion that identifies the voice message; wherein the e-mail box is in a computer system distinct from the voice mail system;

the synchronization module including instructions for performing a synchronization operation by:

retrieving from the e-mail box predefined portions of the messages therein that correspond to voice messages in the voice mailbox, each retrieved predefined portion identifying the corresponding voice message;

comparing the retrieved predefined portions with the voice messages in the voice mailbox to identify the voice messages, if any, for which there is no corresponding message in the e-mail box; and deleting the identified voice messages;

wherein the voice mail module instructions and synchronization module instructions do not create and do not utilize a database identifying respective voice messages corresponding to respective messages in the e-mail box;

whereby when the particular user deletes from the e-mail box a message corresponding to a voice message, the voice message is automatically deleted from the voice mailbox by the synchronization module.

14. The voice mail system of claim 13, wherein the comparing instructions include instructions for identifying the e-mail messages, if any, for which there is no corresponding voice message in the voice mailbox; and the synchronization module includes instructions for deleting the identified e-mail messages in the e-mail box;

whereby when the particular user deletes from the voice mailbox a voice message, the corresponding message in the e-mail box is automatically deleted.

15. The voice mail system of claim 14, wherein the synchronization module further includes instructions for:

retrieving from the e-mail box a read status for at least one of the messages therein that corresponds to a voice message in the voice mailbox;

comparing the retrieved read status with a listened-to status for the corresponding voice message in the voice mailbox; and if the retrieved read status does not match the listened-to status, changing one of the read status and listened-to status accordingly.

16. The voice mail system of claim 14, wherein the synchronization module further includes instructions for:

retrieving from the e-mail box a predefined status value for at least one of the messages therein that corresponds to a voice message in the voice mailbox;

comparing the retrieved predefined status value with a corresponding status value for the corresponding voice message in the voice mailbox; and if the retrieved predefined status value does not match the corresponding status value, changing one of the predefined status value and corresponding status accordingly.

17. The voice mail system of claim 13, wherein the deleting instructions comprise instructions for marking the identified e-mail messages for deletion.

18. The voice mail system of claim 13, wherein the predefined portion of a message in the e-mail box that corresponds to a voice message in the voice mailbox includes a subject field of a header of the message having text there in that identifies the corresponding voice message.

19. The voice mail system of claim 13, wherein the predefined portion of a message in the e-mail box that corresponds to a voice message in the voice mailbox includes a "from" field of a header of the message having text there in that identifies the corresponding voice message.

20. The voice mail system of claim 13, wherein the predefined portion of the messages in the e-mail box is selected from a group consisting of a header of the messages and a body of the messages.

21. The voice mail system of claim 13, further including scheduling instructions for periodically initiating execution of the retrieving, comparing and deleting instructions.

22. The voice mail system of claim 13, further including login instructions for initiating execution of the retrieving, comparing and deleting instructions when the user performs a login to access the user's voice mailbox.

23. The voice mail system of claim 13, further including scheduling instructions for automatically initiating execution of the retrieving, comparing and deleting instructions at predetermined intervals.

24. The voice mail system of claim 13, wherein the deleting instructions comprise instructions for marking the identified voice mail messages for deletion.

25. A computer program product for use in conjunction with a computer system, the computer program product comprising a computer readable storage medium and a computer program mechanism embedded therein, the computer program mechanism comprising:

a voice mail module, for execution by the computer system;

a synchronization module, for execution by the computer system; and a respective voice mailbox associated with each of a plurality of respective users of the voice mail system, each voice mailbox for storing voice messages;

the voice mail module including instructions for storing a voice message in a voice mailbox of a particular user, and for sending for storing in a e-mail box of the particular user a corresponding e-mail message having a predefined portion that identifies the voice message; wherein the voice mailbox and e-mail box are in distinct computer systems;

the synchronization module including instructions for performing a synchronization operation by:

retrieving from the e-mail box predefined portions of the e-mail messages therein that correspond to voice messages in the voice mailbox, each retrieved predefined portion identifying the corresponding voice message;

comparing the retrieved predefined portions with the voice messages in the voice mailbox to identify the voice messages, if any, for which there is no corresponding message in the e-mail box; and deleting the identified voice messages;

whereby when the particular user deletes from the e-mail box a message corresponding to a voice message, the voice message is automatically deleted from the voice mailbox by the synchronization module.

26. The computer program product of claim 25, wherein the comparing instructions include instructions for identifying the e-mail messages, if any, for which there is no corresponding voice message in the voice mailbox; and the synchronization module includes instructions for deleting the identified e-mail messages in the e-mail box;

whereby when the particular user deletes from the voice mailbox a voice message, the corresponding message in the e-mail box is automatically deleted.

27. The computer program product of claim 26, further including:

retrieving from the e-mail box a read status for at least one of the messages therein that corresponds to a voice message in the voice mailbox;

comparing the retrieved read status with a listened-to status for the corresponding voice message in the voice mailbox; and if the retrieved read status does not match the listened-to status, changing one of the read status and listened-to status accordingly.

28. The computer program product of claim 26, wherein the synchronization module further includes instructions for:

retrieving from the e-mail box a predefined status value for at least one of the messages therein that corresponds to a voice message in the voice mailbox;

comparing the retrieved predefined status value with a corresponding status value for the corresponding voice message in the voice mailbox; and if the retrieved predefined status value does not match the corresponding status value, changing one of the predefined status value and corresponding status accordingly.

29. The computer program product of claim 25, wherein the deleting instructions comprise instructions for marking the identified e-mail messages for deletion.

30. The computer program product of claim 25, wherein the predefined portion of a message in the e-mail box that corresponds to a voice message in the voice mailbox includes a subject field of a header of the message having text there in that identifies the corresponding voice message.

31. The computer program product of claim 25, wherein the predefined portion of a message in the e-mail box that corresponds to a voice message in the voice mailbox includes a "from" field of a header of the message having text there in that identifies the corresponding voice message.

32. The computer program product of claim 25, wherein the predefined portion of the messages in the e-mail box is selected from a group consisting of a header of the messages and a body of the messages.

33. The computer program product of claim 25, further including scheduling instructions for periodically initiating execution of the retrieving, comparing and deleting instructions.

34. The computer program product of claim 25, further including login instructions for initiating execution of the retrieving, comparing and deleting instructions when the user performs a login to access the user's voice mailbox.

35. The computer program product of claim 25, further including scheduling instructions for automatically initiating execution of the retrieving, comparing and deleting instructions at predetermined intervals.

36. The computer program product of claim 25, wherein the deleting instructions comprise instructions for marking the identified voice mail messages for deletion.

* * * * *

UNITED STATES PATENT AND TRADEMARK OFFICE
CERTIFICATE OF CORRECTION

PATENT NO. : 6,697,458 B1
DATED : February 24, 2004
INVENTOR(S) : Kunjibettu, Shreesha It is certified that error appears in the above-identified patent and that said Letters Patent is hereby corrected as shown below:

<u>Column 14,</u>
Line 23, after "…messages;" and before "whereby…", insert the following paragraph:
-- wherein the voice mail module instructions and synchronization module instructions do not create and do not utilize a database identifying respective voice messages corresponding to respective messages in the e-mail box; --.

Signed and Sealed this

Twenty-fourth Day of August, 2004

JON W. DUDAS
*Director of the United States Patent and Trademark Office*